(No Model.)
J. H. BASSLER.
APPARATUS FOR CONDENSING LIQUIDS.
No. 394,433. Patented Dec. 11, 1888.
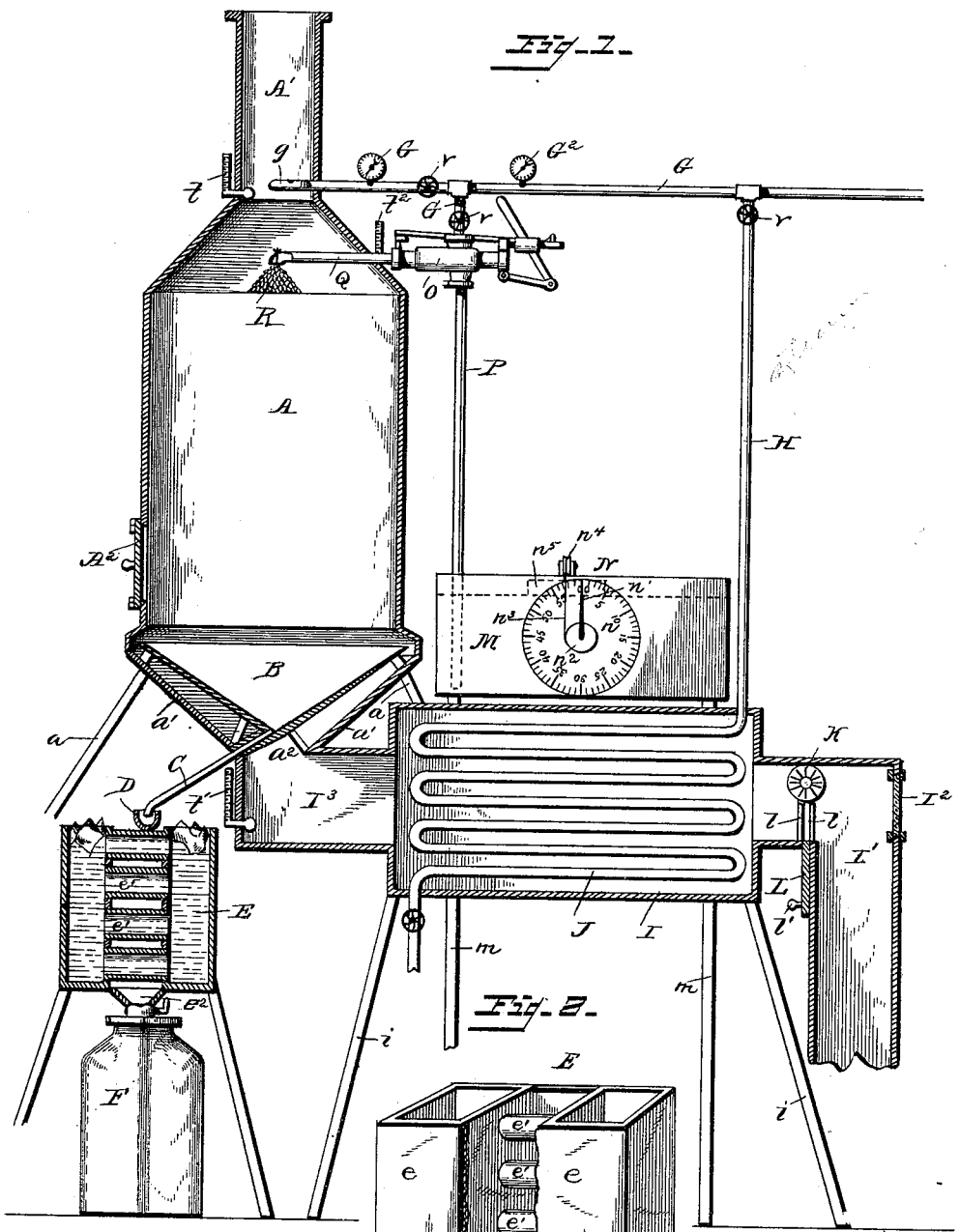

UNITED STATES PATENT OFFICE.

JOHN H. BASSLER, OF MYERSTOWN, PENNSYLVANIA.

APPARATUS FOR CONDENSING LIQUIDS.

SPECIFICATION forming part of Letters Patent No. 394,433, dated December 11, 1888.

Application filed February 24, 1888. Serial No. 265,120. (No model.)

*To all whom it may concern:*

Be it known that I, JOHN H. BASSLER, a citizen of the United States of America, residing at Myerstown, in the county of Lebanon and State of Pennsylvania, have invented certain new and useful Improvements in Apparatus for Condensing Liquids, of which the following is a specification, reference being had therein to the accompanying drawings.

My invention relates to an apparatus for vaporizing and expelling the aqueous element contained in cane-juice, glucose, solutions of tannin, milk, &c.; and it consists in certain details of construction and combinations of parts, which will first be described in connection with the accompanying drawings and then clearly pointed out in the claims.

In the drawings, Figure 1 is a vertical section of the apparatus, partly in elevation. Fig. 2 is a perspective view, in detail, of the cooling-vessel, partly broken out in front to show the pipes.

Referring to the annexed drawings, A represents a vertical evaporating-vessel, preferably cylindrical in form, and having an outlet-flue, A', at its top, in which is placed a thermometer, $t$, the said vessel resting upon supports $a$, the bottom $a'$ sloping downward and being open, as at $a^2$, so as to leave open communication with the flue of the hot-air box. The vessel is also provided with a door, $A^2$, to afford access to the interior for cleaning it.

The evaporating-vessel is provided a short distance above its bottom with a hopper, B, the diameter of which is somewhat less than that of the lower part of the vessel, by reason of which an annular space is left between the hopper and the walls of the vessel. One end of a drain-tube, C, communicates with the interior of the hopper, and the other end leads into a seal-cup, D, in a cooling-vessel, E, filled with water and ice.

The cooling-vessel consists of two small boxes, $e$, connected by a series of pipes, $e'$, the ends of which communicate with the interior of the boxes, the space in which the pipes are located being closed both in front and rear. Directly under these pipes, at the bottom of the cooling-vessel and connected thereto, is a funnel, $e^2$, under which a can, F, is to be placed when the apparatus is in operation.

G represents a steam-pipe leading from any suitable steam-generator, with which a branch pipe, H, connects, the said branch pipe also connecting with a steam-coil, J, in a hot-air box, I, provided at one end with a square inlet-flue, I', in communication, preferably, with a suitable sub-earth duct, and at the other end with an outlet-flue, I³, in communication with the evaporating-vessel A, as above stated, the said box resting on supports $i$.

K represents an anemometer hung in the inlet-flue I', for the purpose of ascertaining the velocity, and consequently the quantity, of air admitted to the hot-air box, it being represented in the drawings at a right angle to its true position; and I² represents a glass window in said flue, through which the anemometer is visible.

A sliding gate, L, working between cleats $l$ in the inlet-flue and held in the desired position by a binding-screw, $l'$, serves to regulate the volume of air admitted to said box. A thermometer, $t'$, in the outlet-flue of the hot-air box, serves to indicate the temperature of the air passing into the evaporating-vessel.

M represents a box for containing the liquid to be treated, which box in this instance is placed to one side of the hot-air box and on a higher plane, being supported by legs $m$; but it will be apparent that it may be located in any convenient position.

Attached to the box M is an indicator, N, for denoting the quantity of liquid in the box. It consists of a dial, $n$, and a pointer, $n'$, attached to an arbor, $n^2$, which revolves freely. One end of a wire, $n^3$, passes around and is attached to the arbor, and the other end passes up over a pulley, $n^4$, on top of the box, and then down into the box, where it is secured to a float, $n^5$. (Seen in dotted lines.)

O indicates an injector, preferably of the Sellers type, which is connected with the steam-pipe G by a short branch pipe, G', and another pipe, P, leads from the injector to near the bottom of box M inside. Still another pipe, Q, to which is attached a thermometer, $t^2$, leads from the injector to the interior of the evaporating-vessel A, near its top, and is provided at its inner end with a spraying device, R.

If it is desired to pass the hot air through the evaporating-vessel more rapidly than is possible with the ordinary draft, I extend the steam-pipe G into the flue A' and provide the inner end of the pipe with a steam-jet, $g$, whereby steam may be exhausted directly into the flue, thereby producing an exhaust-draft.

For the purpose of ascertaining at any time the pressure of steam admitted to the injector and also into the flue, I place steam-gages $G^2$ $G^3$ on pipe G.

The various steam-pipes are provided with globe-valves $v$ at suitable places.

The operation of my apparatus is as follows: Steam is first let into the injector, which draws liquid from box M in a steady and continuous stream. As the liquid enters the injector, it will, together with the exhaust-steam, be forced forward into the evaporating-vessel, where it will be sprayed in a downward and outward direction, the steam at once liberating itself from the liquid and passing off through the flue of the vessel, but meanwhile heating the upper portion of the vessel. Now as the solution is sprayed into a portion of the evaporating-vessel thus heated by the steam, in its descent spreading out in thin films over practically the whole inner diameter of the vessel, it comes into contact with the hot air from the hot-air box, and is compelled to pass through it during its entire travel to the hopper, thus subjecting the solution to evaporative influences during all that time, whereby the desired per cent. of the aqueous element will sooner or later be effectually evaporated and driven off. The solution on reaching the hopper passes through the drain-tube into the seal-cup, and from this latter overflows onto the upper pipe, $e'$, of the cooling-vessel, around which it flows to the under side, and then drops down onto the next pipe, $e'$, and so on until it reaches the funnel, $e^2$, by which it is directed into the can. As the boxes $e$, forming the cooling-vessel, are filled with water and ice, and the pipes lead from one box to the other, it follows that they (the pipes) will always be kept cool, and that the fluid flowing over them will consequently be cooled. As the seal-cup is never empty during the time the apparatus is in operation, the liquid therein prevents the admission of air through the drain-tube into the evaporating-vessel.

It will be apparent that the purpose of the thermometers, the anemometer, and the indicator is to enable the operator to so regulate the volume of air and the quantity of liquid admitted to the evaporating-vessel as to produce the required per cent. of evaporation. For the purpose, however, of showing just how the apparatus should be regulated, I present the following formula, taking milk as the liquid to be evaporated, although any of the liquids may be as readily treated by the operator after once becoming acquainted with the manner of regulating the apparatus for milk.

Assuming the temperature at $t'$ to be 212° and at $t$ 100°, then the heat applied in vaporizing the aqueous element is 212°—100°=112°; or, since the specific heat of air is .238, then 112×.238=26.656, which represents the units of heat per pound of air. Now, since to vaporize one pound of water requires 1178 units of heat, and assuming that the temperature at $t^2$ is 212°, then 1178—212÷26.656=36.24, which represents the weight of air in pounds required to vaporize one pound of water. We now have the weight of air which at the above temperature is necessary to vaporize one pound of water.

To ascertain the volume of air, we will suppose that the evaporating-vessel is six feet in diameter, giving a sectional area of 28.2744 square feet, and that sixteen cubic feet of air at the temperature at $t'$ equals one pound, then 36.24×16÷28.2744=20.50, which will represent the velocity of the air-current in the evaporating-vessel in feet per second. At this rate three thousand six hundred pounds of water are vaporized per hour; but as I aim to vaporize in a single vessel but six hundred pounds of the aqueous element per hour, or condense twelve hundred pounds of milk, fifty per cent. in bulk, then the air-current must be reduced to one-sixth of 20.50, which equals 3.42, the velocity of feet per second, which, according to the tables of Rouse-Smeaton, is a current of air just perceptible. Again, assuming that the sectional area of the inlet-flue is four square feet, and that twelve and one-half cubic feet of cold air is one pound in weight, then 36.24×12.5÷4×6=19, which is the velocity of air in feet per second required to vaporize six hundred pounds of water at the above-stated temperatures.

Should the operator wish to ascertain the per cent. of evaporation of the liquid before he has regulated the apparatus to produce a given per cent. of evaporation, he can do so by simply noting the quantity of liquid taken from the liquid-box, which the indicator will show in pounds, and then weighing the condensed liquid in the receiving-can; then, if from this calculation he should find that the liquid has not been sufficiently condensed, he can return it to the liquid-box, to be again passed through the apparatus.

Having thus described my invention, what I claim as new, and desire to secure by Letters Patent, is—

1. The combination, with the vertically-arranged evaporating-vessel having an exit-flue at its top, of a hot-air box in open communication with the interior of the bottom portion of said vessel, a box containing the liquid to be treated, a steam-supply pipe, and mechanism, substantially as described, for forcing and spraying the liquid under steam-pressure and mixed with steam into the top portion of the evaporating-vessel, for the purposes stated.

2. The combination, with a vertically-arranged evaporating-vessel having an exit-flue at its top, of a steam-supply pipe, a box containing the liquid to be treated, an injector in communication with the steam-supply pipe and the said box, a pipe leading from the injector to the interior of the evaporating-vessel near its upper end, and provided at its inner end with a spraying device arranged to spray the liquid downward, and a hot-air box in open communication with the bottom interior portion of the evaporating-vessel, for the purposes set forth.

3. In an apparatus for evaporating liquids, the combination, with a vertical evaporating-vessel having an exit-flue at its top and a downwardly and inwardly sloping bottom open at its lower end, and a hopper within the bottom so constructed as to leave an annular space between the hopper and the walls of the vessel, of a hot-air box in open communication with the interior of the bottom portion of said vessel, a box containing the liquid to be treated, a steam-supply pipe, and mechanism, substantially as described, for forcing and spraying the liquid under steam-pressure and mixed with steam into the upper portion of the evaporating-vessel, for the purposes set forth.

4. The combination, with a vertical evaporating-vessel having an exit-flue at its top and a downwardly and inwardly sloping bottom open at its lower end, and a hopper within the bottom so constructed as to leave an annular space between the hopper and the walls of the vessel, of a hot-air box having an inlet-flue and an outlet-flue, the former provided with a gate for regulating the quantity of air admitted to the box, and the latter in open communication with the interior of the bottom portion of the evaporating-vessel, a steam-supply pipe, a box containing the liquid to be treated, an injector in communication with the steam-supply pipe and the liquid-box, and a pipe leading from the injector to the interior of the evaporating-vessel near its upper end, and provided at its inner end with a spraying device arranged to spray the liquid downward, for the purposes set forth.

5. In an apparatus for evaporating liquids, the combination, with the evaporating-vessel constructed as described and provided with a hopper in its lower end, of a cooling-vessel, a seal-cup in the upper portion of the cooling-vessel, and a drain-pipe leading from the interior of the hopper to the said cup, for the purpose stated.

6. In an apparatus for evaporating liquids, the combination, with the evaporating-vessel constructed as described and provided with a hopper in its lower end, of a cooling-vessel constructed of two receptacles for ice and water and pipes connecting said receptacles, thus affording open communication between them, a seal-cup in the upper portion of the cooling-vessel, and a drain-pipe leading from the interior of the hopper to said cup, for the purposes stated.

In testimony whereof I affix my signature in presence of two witnesses.

JOHN H. BASSLER.

Witnesses:
JOHN C. THAYER,
ALBERT SPEIDEN.